Nov. 25, 1952 P. C. TEMPLE 2,619,104
VALVE MECHANISM
Filed Sept. 13, 1946 6 Sheets-Sheet 1

Fig. 1

Inventor
PAUL C. TEMPLE

By Albert G. Blodgett
Attorney

Inventor
PAUL C. TEMPLE
By Albert G. Blidgett
Attorney

Fig. 9

Nov. 25, 1952 P. C. TEMPLE 2,619,104
VALVE MECHANISM
Filed Sept. 13, 1946 6 Sheets-Sheet 6

Inventor
PAUL C. TEMPLE
By Albert G. Blodgett
Attorney

Patented Nov. 25, 1952

2,619,104

UNITED STATES PATENT OFFICE 2,619,104

VALVE MECHANISM

Paul C. Temple, Decatur, Ill., assignor to A. W. Cash Company, Decatur, Ill., a corporation of Delaware Application September 13, 1946, Serial No. 696,774

6 Claims. (Cl. 137—86)

This invention relates to valve mechanisms, and more particularly to mechanisms of the type known as pilot controllers which are arranged to vary the pressure of an operating fluid in response to variations in a control force. The control force is frequently derived from the pressure of a primary fluid.

Pilot controllers are often used in connection with diaphragm motor valves having a valve member actuated by a fluid pressure responsive diaphragm, the valve member controlling the flow of the primary fluid. In such service the pilot controller is arranged to respond to variations in the pressure of the primary fluid, and to vary the pressure of an operating fluid which is applied to the diaphragm of the motor valve, for the purpose of minimizing variations in the primary fluid pressure despite wide changes in the rate of flow.

It is found that pilot controllers as heretofore constructed have a tendency to hunt, particularly upon sudden and appreciable changes in the pressure of the primary fluid. In response to such a pressure change the controller will overshoot, producing too great a change in the pressure of the operating fluid, whereupon the controller will reverse and over-shoot in the opposite direction. Consequently the valve member of the diaphragm motor valve may be moved back and forth many times before becoming stationary in the correct position corresponding to the current demand for primary fluid. This causes undesirable fluctuations in flow and pressure, and in addition results in undue wear on the various parts of the controller and the motor valve.

It is accordingly one object of the invention to provide a pilot controller including a stabilizing mechanism arranged to counteract any hunting tendency and cause the controller to operate in a smooth and steady manner.

It is a further object of the invention to provide a pilot controller including a stabilizer having means whereby the stabilizing action may be readily adjusted, so that the controller may be caused to operate in the best and most efficient manner under the particular conditions encountered at installation.

Pilot controllers ordinarily include a pilot valve which serves to control the pressure of the operating fluid, and this valve has to be moved to a new position in order to change the operating fluid pressure. In prior controllers these pilot valve movements are brought about solely by a device which moves in response to changes in the pressure of the primary fluid. Consequently there will be an appreciable variation in the primary fluid pressure as the demand for primary fluid varies between maximum and minimum. For example, in an installation intended to supply primary fluid at say 100 pounds pressure, the pressure may drop to 98 pounds before the pilot controller will open the motor valve fully, and it may increase to 102 pounds before the controller will close the motor valve fully. In installations requiring highly accurate control, such variations in pressure will not be acceptable.

It is accordingly a further object of the invention to provide a pilot controller which will maintain a control force, such as the pressure of a primary fluid, substantially constant over a wide operating range.

It is a further object of the invention to provide a pilot controller adapted for installation in connection with a motor valve to control the flow of a primary fluid, the controller being so constructed that there will be no appreciable variation in the pressure of the primary fluid, whether the motor valve is wide open or substantially closed.

It is a further object of the invention to provide a pilot controller having a simple, inexpensive, and efficient pilot valve mechanism to control the pressure of the operating fluid.

It is a further object of the invention to provide a pilot controller having a pilot valve and a single and effective operating mechanism therefor including yieldable means arranged to prevent the application of excessive force to the pilot valve.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts.

Figure 1:
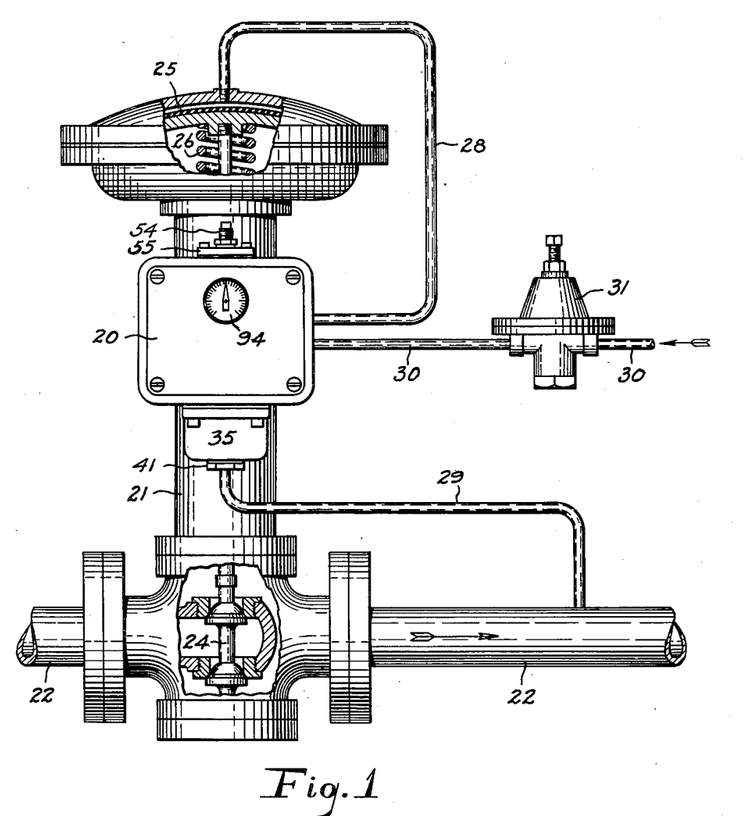
Fig. 1 is a front elevation of my improved pilot controller in association with other apparatus.

Referring first to Fig. 1, there is shown a pilot controller 20 arranged to control the operation of a diaphragm motor valve 21 which is mounted in a pipe line 22 through which a primary fluid flows in the direction of the arrow. The motor valve 21 is of a well-known construction, and includes a slidable valve member 24 which is actuated by a flexible diaphragm 25 loaded by a spring 26. This spring tends to close the valve, and by applying varying degrees of operating fluid pressure to the diaphragm the valve can be opened to any extent desired, in opposition to the spring. This varying fluid pressure is transmitted to the diaphragm through a pipe 28 leading from the pilot controller 20. The controller is arranged to respond to variations in the primary fluid pressure at the discharge side of the motor valve 21, and for this purpose a pipe 29 is provided to transmit this pressure from the pipe 22 to the controller. A pipe 30 is arranged to supply an operating fluid, preferably compressed air, from a suitable source (not shown) to the controller, and the pressure at the controller is preferably maintained substantially constant by means of a suitable pressure reducing and regulating valve 31 of well-known construction. The controller 20 is so constructed and arranged as to reduce the pressure of the air received through the pipe 30 and to vary the pressure-reduction in accordance with the slightest change in the pressure of the primary fluid transmitted through the pipe 29. The reduced air pressure is transmitted through the pipe 28 to the diaphragm 25 and controls the valve member 24, which opens or closes as may be required to restore the desired pressure in the pipe 22 at the delivery side of the motor valve.

Figures 2, 3, 4:
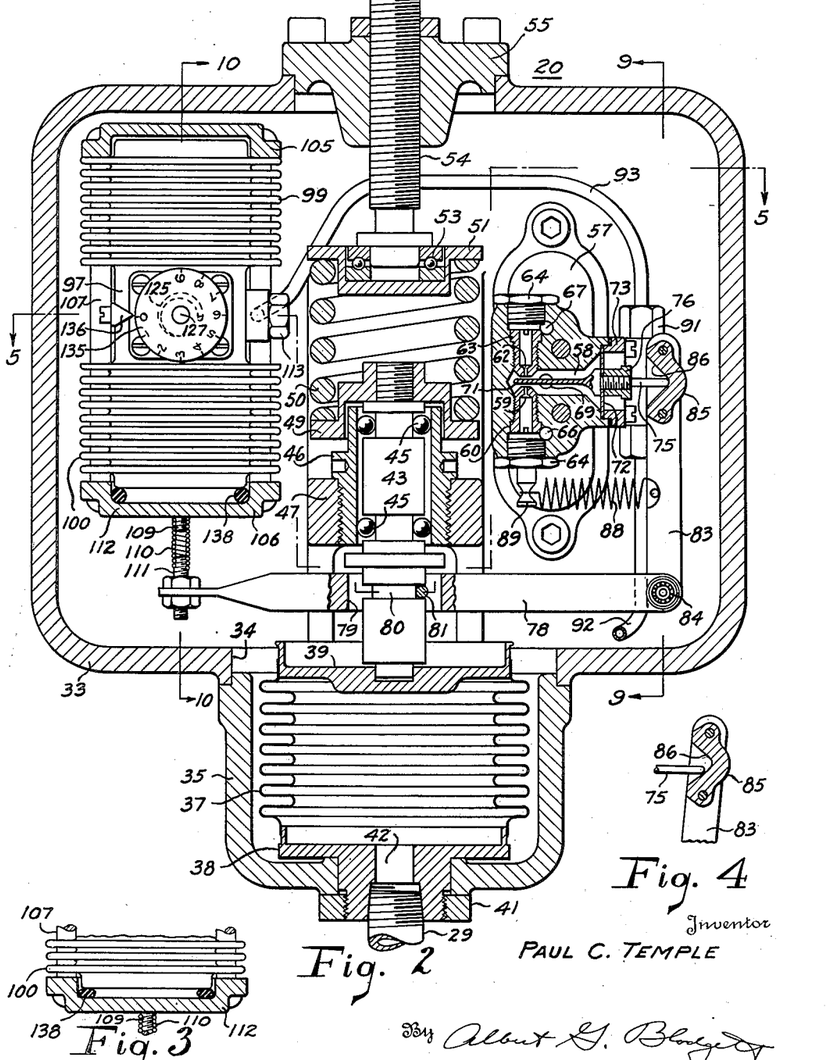
Fig. 2 is a vertical section through the pilot controller, taken substantially on the line 2—2 of Fig. 5, but with certain parts shown in full.
Fig. 3 is a fragmentary view illustrating the operation of a portion of the stabilizing mechanism.
Fig. 4 is a fragmentary view illustrating the operation of a portion of the operating mechanism for the pilot valve.

Referring now to Fig. 2, it will be seen that the controller 20 comprises a hollow frame or casing 33 having an opening 34 in its bottom wall, this opening being closed by a cup 35 thereneath which is attached to the casing. Within this cup there is mounted a fluid pressure responsive device in the form of a corrugated diaphragm or bellows 37 secured at its lower end to a head 38 and at its upper end to a head 39. The lower head 38 is fastened to the bottom of the cup 35 by means of a nut 41. This lower head has an opening 42 therethrough to which the pipe 29 is connected. The upper head 39 engages the lower end of a vertical stud 43 which is guided for vertical sliding movements by means of two vertically spaced annular rows of ball bearings 45 mounted within circumferential grooves in the stud and surrounded by a vertical sleeve 46. This sleeve is mounted in a bracket 47 which projects forwardly from the rear wall of the casing 33. On the upper end of the stud 43 there is mounted a saddle 49 which supports the lower end of a coiled compression spring 50, the upper end of this spring engaging a saddle 51. This upper saddle 51 is supported by a ball thrust bearing 53 carried on the lower end of a vertical adjusting screw 54 which extends through a nut 55 secured to the upper wall of the casing 33.

Figure 9:
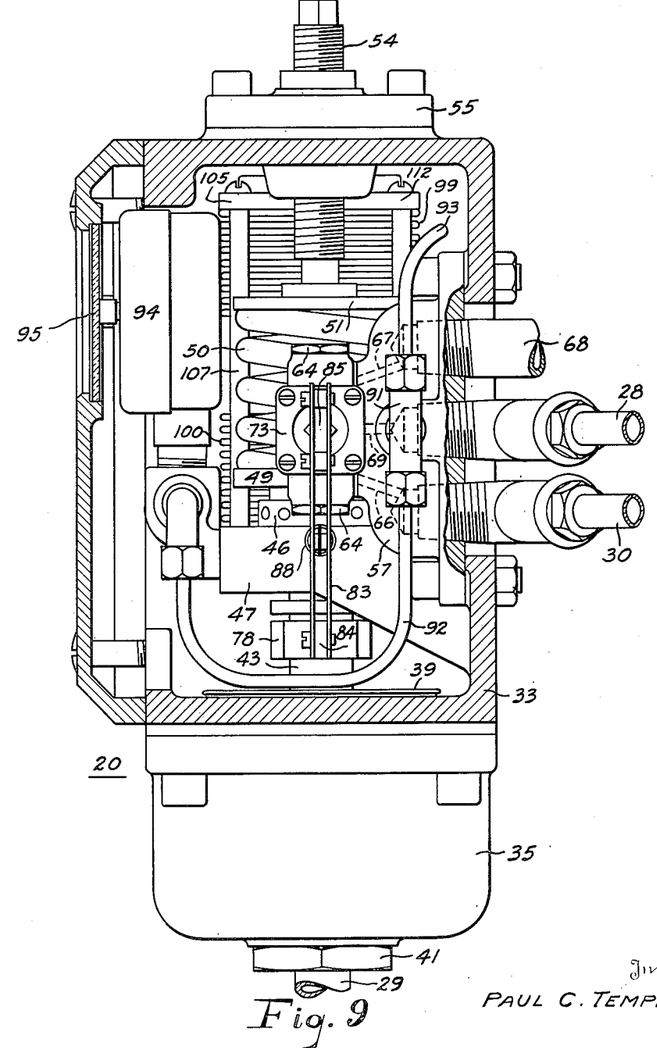
Fig. 9 is a section taken substantially on the line 9—9 of Fig. 2.

The upper head 39 will move vertically in response to pressure changes within the bellows 37, and these movements are employed to actuate a pilot valve mechanism. This mechanism comprises a valve body 57 located within the casing 33 at the right hand side of the spring 50 (as viewed in Fig. 2) and bolted to the rear wall of the casing. This body 57 is shaped to provide a chamber 58 which is supplied with operating fluid through an inlet port 59 formed by a screw-threaded vertical bushing 60 mounted in the body with its upper end extending into the chamber 58. Operating fluid may escape through an exhaust port 62 formed by a screw-threaded vertical bushing 63 mounted in the body with its lower end extending into the chamber 58. The two bushings 60 and 63 are vertically aligned, and they are inserted through openings in the body 57 which are closed at their outer ends by means of suitable plugs 64. The inlet bushing 60 is in communication with a passage 66 which extends rearwardly through the body 57 and connects with the air supply pipe 30, as best shown in Fig. 9. Similarly, the exhaust bushing 63 is in communication with a passage 67 which extends rearwardly through the body 57 and connects with an exhaust pipe 68. If air is used as the operating fluid, this pipe 68 will simply exhaust into the atmosphere. A third passage 69 leads rearwardly from the chamber 58 through the body 57 and connects with the pipe 28.

By controlling the flow through the ports 59 and 62, it is possible to control the fluid pressure within the chamber 58. For this purpose there is provided a pilot valve 71 (Fig. 2) comprising a thin flat horizontal blade with its left end portion located between the adjacent ends of the opposed bushings 60 and 63. Preferably these parts are so constructed and arranged that the blade need move only a few thousandths of an inch up or down to close the ports 62 or 59 respectively. The chamber 58 is closed at its right hand side by means of a thin vertical flexible diaphragm 72, preferably of metal, the edge portions of the diaphragm being clamped against the valve body 57 by means of a ring 73. The pilot valve 71 is provided with a horizontal stem 75 which extends through the diaphragm. This stem is provided with a threaded portion to receive a nut 76 which is tightened against the diaphragm and thus fastens the pilot valve thereto. The diaphragm provides a fulcrum for the pilot valve so that the valve is pivotally supported intermediate its length.

A mechanical connection is provided between the vertically movable stud 43 and the outer or right hand end of the pilot valve stem 75, the construction preferably being such as to prevent the transmission of excessive force to the relatively fragile stem. For this purpose, a horizontal floating lever 78 is provided directly above the upper head 39 of the bellows 37. This lever is fulcrumed at its left end by a stabilizing means which will be described hereinafter. An opening 79 is provided through the intermediate portion of the lever, and the stud 43 extends through this opening with ample clearance, the adjacent portion of the stud having a circumferential groove 80 therein. A pin 81 is mounted in the lever 78 to extend horizontally across the opening 79, at the right hand side of the stud and in engagement with the groove 80. The pin 81 provides a pivotal connection between the stud 43 and the lever 78. The right hand end of the lever 78 is connected to the pilot valve stem 75 by an upright link 83. The lower end of this link is pivotally connected to the lever by means of a ball bearing 84. On the upper end of the link there is provided a block 85 having a V-shaped recess 86 therein to receive the outer end of the valve stem 75. A light coiled tension spring 88 extends between the link 83 and a stud 89 which projects downwardly from the lower plug 64. This spring provides sufficient force to hold the pin 81 in the groove 80, and to maintain the end of the valve stem 75 at the bottom of the recess 86, as shown in Fig. 2, under normal operating conditions. However, if the lever 78 moves in either direction beyond the point necessary to seat the pilot valve 71, one or the other of the sloping sides of the recess 86 will slide along the end of the valve stem 75 and cause the link 83 to swing to the right, as indicated in Fig. 4. In this manner damage to the pilot valve mechanism will be avoided.

Figure 11:
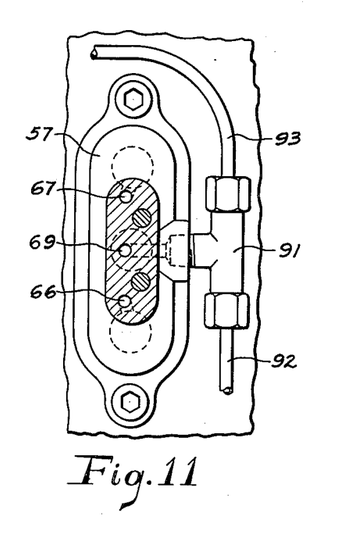
Fig. 11 is a section taken substantially on the line 11—11 of Fig. 5.

Referring now to Fig. 11, it will be seen that the passage 69, which connects the pilot valve chamber 58 with the pipe 28, is also connected to a T-shaped fitting 91 from which a tube 92 extends downwardly and a tube 93 extends upwardly. The tube 92 leads to a pressure indicating gauge 94 (Figs. 1 and 9) within the front portion of the casing 33 and visible through a transparent glass plate 95. The tube 93 leads to a stabilizing means which provides a fulcrum for the lever 78.

Figure 5:
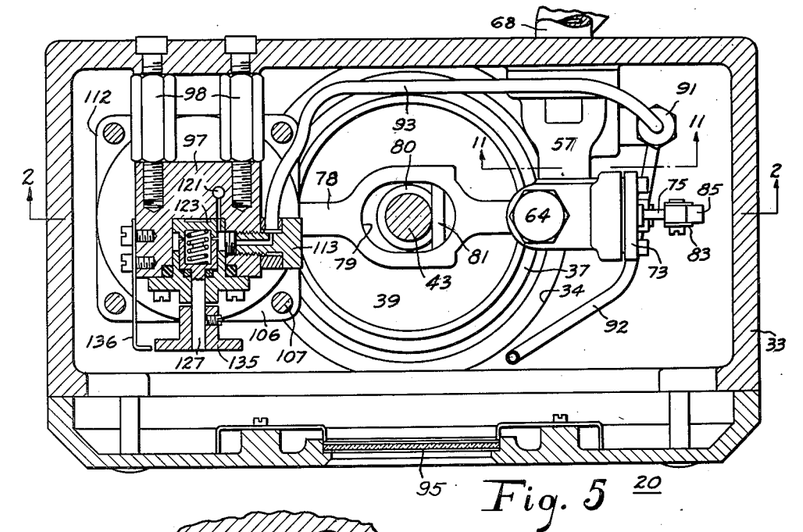
Fig. 5 is a section taken substantially on the line 5—5 of Fig. 2.
Figure 10:
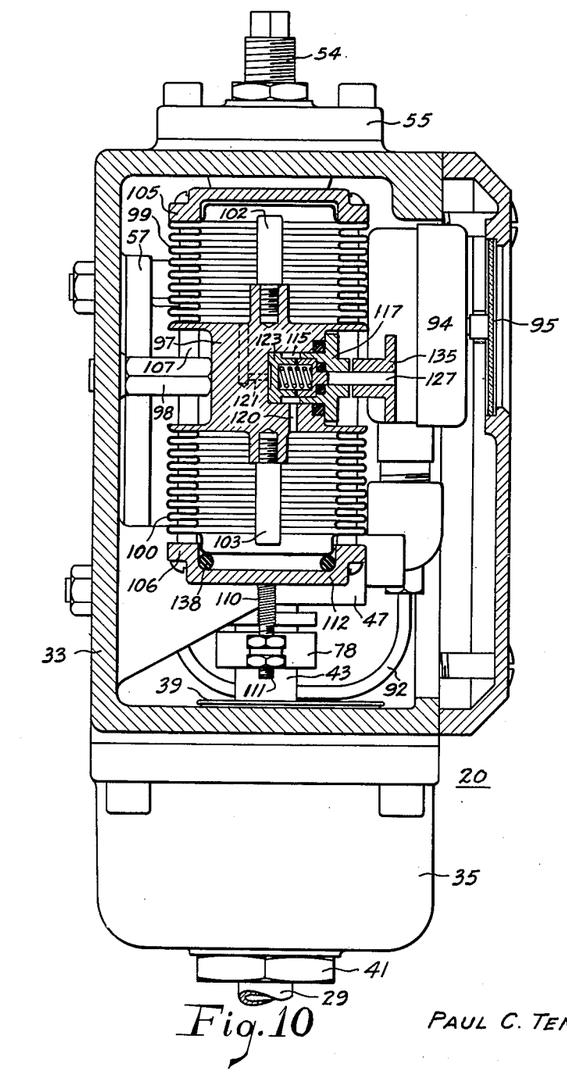
Fig. 10 is a section taken substantially on the line 10—10 of Fig. 2.

This stabilizing means comprises a stationary block or body 97 which is rigidly attached to the rear wall of the casing 33 by means of two studs 98 (Fig. 5). As shown in Fig. 10, a fluid pressure responsive device in the form of a corrugated flexible diaphragm or bellows 99 is secured to the upper surface of the block 97, and a similar bellows 100 is secured to the lower surface of the block. The bellows 99 is closed at its upper end and tends to expand upwardly upon an increase in the fluid pressure therein, while the bellows 100 is closed at its lower end and tends to expand downwardly upon an increase in the fluid pressure therein. The block 97 forms a partition wall which separates the interiors of the two bellows. A stud 102 projects upwardly from the block 97 into the bellows 99 to limit collapsing movement thereof, and a similar stud 103 projects downwardly from the block into the bellows 100 to limit collapsing movement thereof. The upper end of the bellows 99 is supported by a cap 105, and the lower end of the bellows 100 is supported by a similar cap 106, these two caps being rigidly connected to one another by four vertical rods 107 located outside the bellows. The lower cap 106 is provided with a downwardly projecting screw-threaded stud 109 (Fig. 2) which is connected by a tightly coiled helical wire spring 110 to a similar stud 111 carried by the left end of the lever 78. This spring 110 is capable of transmitting appreciable vertical forces, but it will yield readily to even very slight lateral forces, and it provides a fulcrum for the lever.

Figure 6:
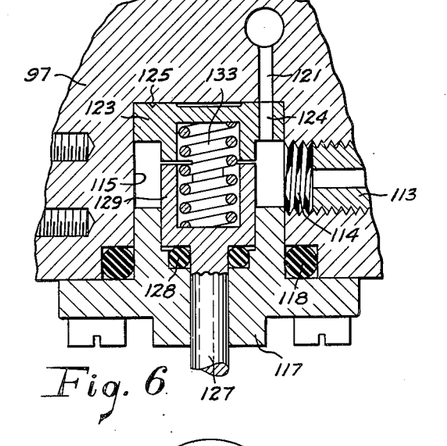
Fig. 6 is an enlargement of a portion of Fig. 5.

The rigid structure formed by the two caps 105 and 106 and the four rods 107 provides a yoke 112 which will move vertically under the influence of changes in the relative fluid pressures within the two bellows, and these movements shift the fulcrum of the lever 78 in such a manner as to stabilize the operation of the controller. As shown in Figs. 5 and 6, the tube 93 is connected to a fitting 113 which is threaded into a tapped hole 114 in one side of the block 97, and this hole 114 leads laterally into a cylindrical recess 115 in the front of the block. The front end of this recess is closed by a flanged plug 117 and a rubber O-ring seal 118. A vertical passage 120 (Fig. 10) is provided in the block to connect the recess 115 with the interior of the lower bellows 100. Thus the lower bellows is always subjected to the fluid pressure within the tube 93 and the pilot valve chamber 58. An L-shaped passage 121 is provided in the block to connect the inner end of the recess 115 with the interior of the upper bellows 99, and flow through this passage is restricted so that there will be a slight delay, after any change in the pressure within the lower bellows, before the pressure within the upper bellows becomes equalized therewith.

Figure 7:
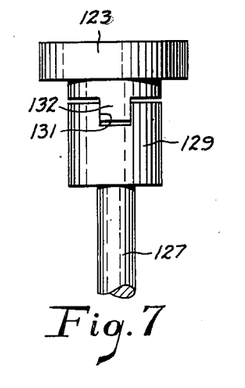
Fig. 7 is a detail view of a pressure-equalizing valve and its actuating stem, forming a part of the pilot controller.
Figure 8:
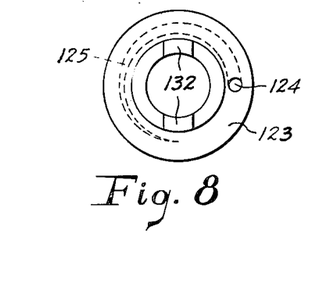
Fig. 8 is an end view of the pressure-equalizing valve.

This restriction of the flow is preferably brought about by a manually adjustable valve mechanism which is best shown in Figs. 6 to 8. This mechanism comprises a valve in the form of a circular disk 123 located within the recess 115 and engaging the flat surface or seat at the rear or inner end of the recess. An eccentrically positioned port 124 extends through this disk, and by turning the disk this port may be brought into registration with the end of the passage 121 to provide free communication between the two bellows. An arcuate groove 125 is provided in the rear surface of the disk, this groove decreasing gradually in cross-sectional area along its length, the larger end of the groove being connected with the port 124. Thus as the disk is turned to move the port out of registration with the passage 121, the flow through this passage will be restricted to an extent dependent upon the angular position of the disk, since the only connection between the port 124 and the passage 121 will be through a portion of the groove 125.

The disk 123 may be turned manually, and for this purpose there is provided a valve stem 127 which extends through the plug 117 in axial alignment with the disk. A rubber O-ring seal 128 surrounds the valve stem. A hollow head 129 is formed on the rear end of the valve stem, this head having two diametrically opposed notches 131 therein to receive two lugs 132 which project forwardly from the valve disk 123. This provides a driving connection between the parts. A coiled compression spring 133 is mounted within the head 129 to engage the valve disk and to hold it firmly in contact with its seat. A handle 135 is secured to the front end of the valve stem, and a pointer 136 is secured to the side of the block 97 and projects forwardly adjacent the handle. As shown in Fig. 2, this handle may bear numerals which, in conjunction with the pointer, serve to indicate the amount of restriction provided by the valve.

The construction of the stabilizer is preferably such that even under conditions of steady flow through the conduit 22, the position of the lower cap 106, which supports the left end of the lever 78, will be dependent upon the fluid pressure in the pilot valve chamber 58 and the amount of opening of the motor valve 21. The change in position of this cap 106 is such as to compensate for the change in position of the pilot valve 71, so that the position of the pin 81 will be the same for all rates of flow in the conduit 22. Thus the pressure within the conduit may be held constant, and the controller will operate without any range of pressure variation.

This result is obtained, in the embodiment illustrated, by providing a yieldable connection between the lower end of the bellows 100 and the lower cap 106 therebeneath. The bellows is not supported in direct contact with the cap, but a yieldable element is located between these parts to transmit the force produced by the fluid pressure within the bellows. In Fig. 2 this element is shown in the form of an O-ring 138 of rubber or similar material, and in Fig. 3 this O-ring is shown somewhat flattened or compressed by the effect of the fluid pressure. Similar results may be obtained from the construction shown in Figs. 12 to 14, which comprises a yieldable element in the form of a flat metal ring 140 having two diametrically opposed upwardly projecting lugs 141 and two diametrically opposed downwardly projecting lugs 142 positioned at ninety degrees with respect to the lugs 141. The lugs 141 engage a washer 143 which rests against the bottom of the bellows 100, and the lugs 142 engage a washer 144 which rests against the top of the cap 106. The pressure within the bellows will flex or distort the ring 140 as indicated.

Figure 12:
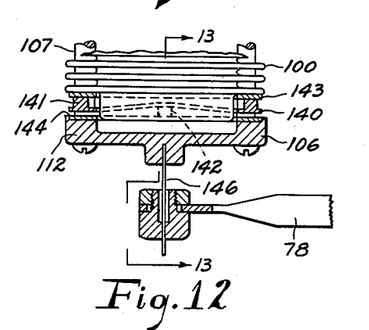
Fig. 12 is a fragmentary view, partially in section, showing a modification in a portion of the construction shown in Fig. 2.
Figure 13:
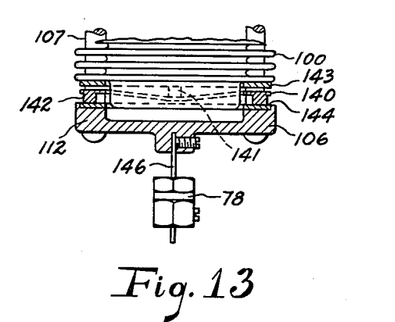
Fig. 13 is a section taken substantially on the line 13—13 of Fig. 12.
Figure 14:
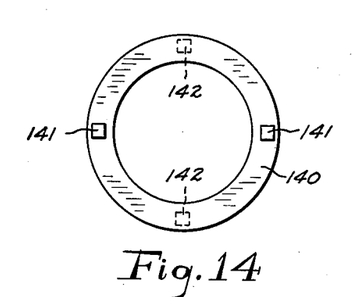
Fig. 14 is a plan view of a flat annular spring forming a portion of the construction shown in Figs. 12 and 13.

Figs. 12 and 13 also disclose a modified construction for the lever fulcrum. In place of the tightly coiled helix 110 of Fig. 2, this modified fulcrum comprises a short vertical wire 146 which is secured at its opposite ends to the cap 106 and to the end of the lever 78 respectively. This wire is sufficiently strong to transmit the required vertical forces, but flexible enough to yield readily at the slightest lateral force.

The operation of the invention will now be apparent from the above disclosure. Under conditions of steady demand for primary fluid from the pipe 22, the fluid pressure transmitted through the pipe 29 to the bellows 37 will be constant and exactly balanced by the force of the spring 50, thus holding the pin 81 in a fixed position. The regulating valve 31 will supply air at a constant pressure through the pipe 39 and the passage 66 to the inlet bushing 60. This air will flow steadily through the inlet port 59 into the chamber 58 and thence through the exhaust port 62, the exhaust bushing 63, the passage 67, and the pipe 68 to the atmosphere. The lever 78 and the link 83 will hold the pilot valve 71 in a fixed position intermediate the ports 59 and 62. The air pressure within the chamber 58 will be constant, and it will be effective, through the passage 69 and the pipe 28, on the diaphragm 25 of the motor valve 21, thus holding the valve member 24 partially open against the force of the spring 26. This same air pressure will also be transmitted through the fitting 91, the tube 93, the fitting 113, and the hole 114 to the recess 115. From this recess the pressure will be transmitted to the lower bellows 100 through the passage 129, and to the upper bellows 99 through the valve port 124, the groove 125 and the passage 121, assuming that the valve disk 123 is adjusted to a partially open position. The yoke 112 will be held in a fixed position, supporting the left end of the lever 78 through the fulcrum member 110 or 146, as the case may be. The O-ring 138 or the annular spring 140, whichever is employed, will be slightly compressed by the pressure within the bellows 100.

If now there is a change in the demand for fluid from the pipe 22 there will be a momentary change in the pressure transmitted to the controller 20 through the pipe 29, and the controller will promptly readjust the motor valve 21 as required to meet the new demand and restore the pressure in the pipe 22 to the desired value. Assuming that there is an increased demand for fluid, the pressure transmitted through the pipe 29 to the bellows 37 will decrease, the head 39 and the stud 43 will move downwardly, lowering the pin 81, and swinging the lever 78 downwardly about the fulcrum 110. This will move the link 83 downwardly and tilt the pilot valve 71 about its fulcrum diaphragm 72, so that the pilot valve will move away from the inlet port 59 and closer to the exhaust port 62. If the movement of the link 83 is more than sufficient to bring the pilot valve into contact with the exhaust bushing 63, the spring 88 will yield and allow the V-notched block 85 to slide along the end of the stem 75, thus avoiding any overstressing of the pilot valve. The movement of the pilot valve will result in increasing the air pressure within the chamber 58, this increased pressure being effective on the motor valve diaphragm 25 and also within the recess 115 of the stabilizer block 97. The diaphragm 25 and the valve member 24 will move downwardly to allow an increased flow through the pipe 22 as required by the new demand and to restore the desired pressure. The increased air pressure within the recess 115 will be transmitted immediately through the passage 129 to the lower bellows 100, and it will be transmitted gradually through the valve port 124, the groove 125 and the passage 121 to the upper bellows 99. The amount of delay in transmitting the increased pressure to the upper bellows will depend upon the adjustment of the valve disk 123. Because of this delay, the lower bellows will expand, the upper bellows will contract, and the yoke 112 will move downwardly, lowering the fulcrum 110. This will tend to counteract the effect of the lowering of the pin 81 by the diaphragm 37 and hence the movement of the pilot valve 71 toward the exhaust port 62 will be less than would otherwise be the case. Consequently the action of the controller will be stabilized and hunting will be avoided. The pressure within the upper bellows 99 will gradually increase until it is equal to that within the lower bellows 100, so that the yoke 112 will move slowly upwardly toward its original position. However the yoke will not stop at its original position, but it will travel slightly beyond the same, for the increased pressure within the diaphragms 99 and 100 will cause an increased deflection of the O-ring 138 (or the spring 140). Thus the lever fulcrum 110 will be held at a slightly higher position than originally, which will tend to hold the pilot valve slightly nearer to the exhaust port 62 to slightly increase the pressure within the pilot valve chamber 58 and effective upon the motor valve diaphragm 25. Consequently the motor valve will open slightly more until the pressure within the pipe 29 has increased to its original value, and the bellows 37 has raised the pin 81 to its original position. Thus, despite the increased demand for primary fluid, the pressure of the primary fluid will be held exactly the same.

If now we assume that there is a decreased demand for primary fluid, the pressure transmitted through the pipe 29 to the bellows 37 will increase, the head 39 and the stud 43 will move upwardly, raising the pin 81, and swinging the lever 78 upwardly about the fulcrum 110. This will move the link 83 upwardly and tilt the pilot valve 71 about its fulcrum diaphragm 72, so that the pilot valve will move toward the inlet port 59 and away from the exhaust port 62. Damage to the pilot valve in the event of excessive lever travel will be avoided by the action of the V-notched block 85. The movement of the pilot valve will reduce the air pressure within the chamber 58, upon the motor valve diaphragm 25, and within the recess 115 of the stabilizer block 97. The valve member 24 of the motor valve will accordingly move upwardly to decrease the flow of primary fluid as required by the decreased demand and to restore the desired pressure. The decreased air pressure within the recess 115 will be effective immediately within the lower bellows 100, and the excess pressure within the upper bellows 99 will gradually escape through the passage 121 and past the valve disk 123, the rate of escape being dependent upon the adjustment of this disk. Because of the delay in the escape of pressure from the upper bellows, the lower bellows will contract, the upper bellows will expand, and the yoke 112 will move upwardly, raising the fulcrum 110. This will tend to counteract the raising of the pin 81 by the diaphragm 37 and consequently the movement of the pilot valve 71 toward the inlet port 59 will be less than would otherwise occur. Thus the action of the controller will be stabilized and hunting will be avoided. As the pressure within the upper bellows 99 gradually decreases until it equals that within the lower bellows 100, the yoke 112 will move slowly downwardly toward its original position. However the yoke will not stop at its original position, but it will travel slightly below the same, for the decreased pressure within the two stabilizer diaphragms will decrease the deflection of the O-ring 138 (or the spring 140). Consequently the lever fulcrum 110 will be held at a slightly lower position than originally, which will tend to hold the pilot valve slightly nearer to the inlet port 59 to slightly decrease the pressure within the pilot valve chamber 58 and effective upon the motor valve diaphragm 25. As a result the motor valve will close slightly more until the pressure within the pipe 29 has decreased to its original value, and the bellows 37 has lowered the pin 81 to its original position. Thus, in spite of the decreased demand for primary fluid, there will be no appreciable change in the pressure thereof.

From the above description it will be apparent that the bellows 99 and 100 provide a fluid pressure responsive means which is subjected to the pressure of the operating fluid in the pilot valve chamber 58, this pressure being under the control of the pilot valve 71. Under conditions of steady demand for primary fluid from the pipe 22, the pressures within the two bellows will be equal. Because of the effect of the compressible O-ring 138 (or of the annuar spring 140) the position of the yoke 112 and of the lever fulcrum 110 will be a function of the primary fluid pressure. If this fluid pressure increases, the yoke will assume a higher position, tending to move the pilot valve in a direction to increase the pressure. If the primary fluid pressure decreases, the yoke will assume a lower position, tending to move the pilot valve in a direction to decrease the pressure. In other words the lever fulcrum is shifted, upon a change in the operating fluid pressure, in a direction tending to move the pilot valve and accentuate the said pressure change. Because of this action, the controller will operate without any appreciable "range," and it will maintain substantially the same primary fluid pressure at all rates of demand. This effect must be distinguished from the stabilizing action, which comes into effect only during changes in demand, for the purpose of preventing hunting. By adjusting the valve handle 135, the stabilizing action may be increased or decreased to fit the particular installation. If wide and frequent changes in demand occur, it is desirable to increase the stabilizing action.

While the operation has necessarily been described as taking place in a series of steps, it will nevertheless actually proceed in a floating manner. Accurate tests of the controller in operation show that throughout a wide range of demand for primary fluid and despite sudden changes in the demand, the pressure of the primary fluid will nevertheless be held exactly constant so far as it is possible to determine from a pressure-recording chart.

Having thus described my invention, what I claim as new and desire to secure by Letters Patent is:

1. A valve mechanism comprising a yieldable device movable in response to variations in a primary control force, a pivotally supported pilot valve arranged to vary the pressure of an operating fluid, a stem projecting outwardly from the pilot valve, and operating mechanism connecting the yieldable device with the pilot valve stem, the said operating mechanism including a link, a block on the link having a V-shaped recess therein arranged to receive the outer end of the pilot valve stem, and means yieldably urging the block into engagement with the said stem, the block being arranged to slide relative to the stem as required to prevent application of excessive force thereto.

2. A valve mechanism comprising a yieldable device movable in response to variations in a primary control force, a lever, means connecting the device to the lever, a pivotally supported pilot valve arranged to vary the pressure of an operating fluid, a stem projecting outwardly from the pilot valve, a link connected to the lever, a block on the link having a V-shaped recess therein arranged to receive the outer end of the pilot valve stem, and a spring yieldably urging the block into engagement with the said stem, the block being arranged to slide relative to the stem as required to prevent application of excessive force thereto.

3. A valve mechanism comprising a yieldable device movable in response to variations in a primary control force, a valve body providing a pilot valve chamber having opposed inlet and outlet ports for an operating fluid, a flexible diaphragm secured to the body and forming a wall of the chamber, a pilot valve pivotally supported by the diaphragm and having an inner portion which extends between the said ports to control the pressure of the operating fluid within the chamber, the pilot valve having a stem which extends outwardly beyond the diaphragm, and means connecting the said yieldable device to the pilot valve stem.

4. A valve mechanism comprising a yieldable device movable in response to variations in a primary control force, a floating lever, means connecting the device to the lever, a pilot valve arranged to control the pressure of an operating fluid, means connecting the pilot valve to the lever, a movable member providing a fulcrum for the lever, two fluid pressure responsive devices connected to the member and tending to move the same in opposite directions, means to subject both devices to the pressure of the operating fluid, and a yieldable element located between one of the devices and the member to cause a shifting of the fulcrum, upon a change in the operating fluid pressure, in a direction tending to move the pilot valve and accentuate the said pressure change.

5. A valve mechanism comprising a yieldable device movable in response to variations in a primary control force, a floating lever, means connecting the device to the lever, a pilot valve arranged to control the pressure of an operating fluid, means connecting the pilot valve to the lever, a movable stabilizer member, two fluid pressure responsive devices connected to the member and tending to move the same in opposite directions, means providing a comparatively free passage through which one of said fluid pressure responsive devices is subjected to the pressure of the operating fluid, a yieldable element located between the said one of the fluid pressure responsive devices and the stabilizer member, means providing a comparatively restricted passage through which the other of the fluid pressure responsive devices is subjected to the pressure of the operating fluid, and means connecting the said stabilizer member to the lever, whereby a hunting action may be avoided during changes in the primary control force.

6. A valve mechanism comprising a yieldable device movable in response to variations in a primary control force, a floating lever, means connecting the device to the lever, a pilot valve arranged to control the pressure of an operating fluid, means connecting the pilot valve to the lever, a stationary block, two flexible bellows secured at their inner ends to opposite sides of the block, a movable yoke supporting the outer ends of the bellows, the block having a comparatively free passage therethrough leading to the interior of one bellows and a comparatively restricted passage therethrough leading to the interior of the other bellows, means to supply operating fluid from the pilot valve to the said passages, a yieldable element located between the outer end of the said one bellows and the yoke, and means connecting the yoke to the lever, whereby a hunting action may be avoided during changes in the primary control force.

PAUL C. TEMPLE.

REFERENCES CITED

The following references are of record in the file of this patent:

UNITED STATES PATENTS

| Number | Name | Date |
|---|---|---|
| 1,296,947 | Blot | Mar. 11, 1919 |
| 1,680,750 | Smoot | Aug. 14, 1928 |
| 2,360,889 | Philbrick | Oct. 24, 1944 |
| 2,380,858 | McMahon | July 31, 1945 |
| 2,413,584 | Side | Dec. 31, 1946 |